United States Patent
Tylik et al.

(10) Patent No.: US 9,141,305 B2
(45) Date of Patent: Sep. 22, 2015

(54) STORAGE RESOURCE USAGE ANALYSIS FOR CUSTOMIZED APPLICATION OPTIONS

(71) Applicants: Dmitry Nikolayevich Tylik, St. Petersburg (RU); Sergey Alexandrovich Alexeev, St. Petersburg (RU); Vitaly Sanislavovich Kozlovsky, St. Petersburg (RU); Alexey Vladimirovich Shusharin, St. Petersburg (RU)

(72) Inventors: Dmitry Nikolayevich Tylik, St. Petersburg (RU); Sergey Alexandrovich Alexeev, St. Petersburg (RU); Vitaly Sanislavovich Kozlovsky, St. Petersburg (RU); Alexey Vladimirovich Shusharin, St. Petersburg (RU)

(73) Assignee: EMC Corporation, Hopkinton, MA (US)

( * ) Notice: Subject to any disclaimer, the term of this patent is extended or adjusted under 35 U.S.C. 154(b) by 43 days.

(21) Appl. No.: 13/978,623

(22) PCT Filed: Dec. 5, 2012

(86) PCT No.: PCT/RU2012/001019
§ 371 (c)(1),
(2) Date: Oct. 2, 2013

(87) PCT Pub. No.: WO2014/088445
PCT Pub. Date: Jun. 12, 2014

(65) Prior Publication Data
US 2014/0156877 A1    Jun. 5, 2014

(51) Int. Cl.
*G06F 3/00* (2006.01)
*G06F 3/06* (2006.01)

(52) U.S. Cl.
CPC .............. *G06F 3/0653* (2013.01); *G06F 3/061* (2013.01); *G06F 3/0605* (2013.01); *G06F 3/067* (2013.01); *G06F 3/0631* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 7,523,231 B1 | 4/2009 | Gupta et al. | |
| 7,822,939 B1 | 10/2010 | Veprinsky et al. | |
| 8,239,584 B1 | 8/2012 | Rabe et al. | |
| 2009/0070541 A1 | 3/2009 | Yochai | |
| 2009/0249018 A1 * | 10/2009 | Nojima et al. | 711/170 |
| 2012/0124319 A1 | 5/2012 | Kirvan et al. | |

* cited by examiner

*Primary Examiner* — Henry Tsai
*Assistant Examiner* — Aurangzeb Hassan
(74) *Attorney, Agent, or Firm* — Muirhead and Saturnell, LLC

(57) ABSTRACT

Described are techniques for analyzing storage resources. I/O operations which are directed to a set of storage resources and received at a data storage system from a first application are monitored. First information characterizing the I/O operations from the first application is collected in accordance with said monitoring. Using the first information, a first execution profile for the first application characterizing I/O operations of the first application is determined. It is determined whether the first execution profile of the first application matches any of a set of predetermined execution profiles for known applications. Each of the predetermined execution profiles characterizes I/O operations of one of the known applications. First processing is performed in accordance with one or more criteria including whether the first execution profile matches any of the set of predetermined execution profiles.

20 Claims, 9 Drawing Sheets

| Case | Criteria | Result/Actions |
|---|---|---|
| A | Observed application fingerprint/I/O profile matches known application AND Application or application type of provisioned resources match known application AND storage resources provisioned using application-specific best practices for known application AND observed performance within expected limits for known application | Best practices work well |
| B | Observed application fingerprint/I/O profile matches known application AND Application or application type of provisioned resources match known application AND storage resources provisioned using application-specific best practices for known application AND observed performance NOT acceptable/within expected limits for known application | Further analysis needed. Best practices may need modification |
| C | Observed application fingerprint/I/O profile matches known application AND Application or application type of provisioned resources does NOT match known application AND storage resources NOT provisioned using application-specific best practices for known application | Further analysis needed. Best practices may need modification |
| D | Observed application fingerprint/I/O profile does NOT match known application | Further analysis needed. May identify need for new application for which to provide best practices |

FIGURE 7

STORAGE RESOURCE USAGE ANALYSIS FOR CUSTOMIZED APPLICATION OPTIONS

CROSS REFERENCE TO RELATED APPLICATIONS

This application is the National Stage of International Application No. PCT/RU2012/001019, filed Dec. 5, 2012, which is expressly incorporated herein by reference in its entirety.

BACKGROUND

1. Technical Field

This application generally relates to data storage systems, and more particularly to techniques used in connection with management of data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system. For example, a customer may perform data storage configuration and provisioning tasks. Such tasks may include, for example, configuring and provisioning storage for use with an email application. Tasks may include allocating storage, specifying the logical and/or physical devices used for the storage allocation, specifying whether the data should be replicated, the particular RAID (Redundant Array of Independent or Inexpensive Disks) level, and the like. With such options in connection with performing configuration and provisioning tasks, a customer may not have the appropriate level of sophistication and knowledge needed.

SUMMARY OF THE INVENTION

In accordance with one aspect of the invention is a method of analyzing storage resources comprising: monitoring I/O operations received at a data storage system from a first application, said I/O operations being directed to a set of one or more storage resources; collecting, in accordance with said monitoring, first information characterizing the I/O operations from the first application; determining, using the first information, a first execution profile for the first application characterizing I/O operations of the first application; determining whether the first execution profile of the first application matches any of a set of one or more predetermined execution profiles for one or more known applications, each of said one or more predetermined execution profiles characterizing I/O operations of one of the known applications; and performing first processing in accordance with one or more criteria, said one or more criteria including whether the first execution profile matches any of the set of one or more predetermined execution profiles. The first execution profile may include any of a size of a write operation, a size of a read operation, an average size of a read operation, an average size of a write operation, a maximum size of a read operation, a maximum size of a write operation, a percentage, mixture, or ratio of read to write operations, a percentage or ratio of reads that are sequential, a percentage or ratio of reads that are random, a total number of I/O operations/time period, a number of read operations/time period, a number of write operations/time period, and an average size of an I/O operation determined for a time period. The method may include collecting information on key parameters of the set of one or more storage resources. The criteria may include whether one or more of the key parameters of the set of one or more storage resources match one or more predetermined key parameters of storage resources included in a customized set of options for one of the known applications and whether a first application type associated with the first application matches a predetermined application type associated with one of the known applications. The first execution profile may match a first known execution profile that is associated with a first of the known applications and included in the set of one or more predetermined execution profiles. The first application type associated with the first application may match a predetermined application type associated with the first known application. The one or more key parameters of the set of one or more storage resources may match one or more predetermined key parameters of storage resources included in a customized set of options for the first known application thereby indicating that the customized set of options was previously used in connection with provisioning the set of one or more storage resources. The criteria may include whether observed performance of the first application is in accordance with expected performance associated with the first known application and the method may include collecting, in accordance with said monitoring, performance data for the first application, said performance data including a first metric providing a measure of performance for the first application; and determining whether the performance data for the first application is in accordance with one or more expected thresholds associated with the first known application. If the performance data for the first application is not in accordance with the one or more expected thresholds associated with the first known application, the first processing may include reporting information regarding the first application and the performance data for the first application not being in accordance with the one or more expected thresholds associated with the first known application to a target location; and determining whether one or more predetermined key parameters of storage resources included in the customized set of options for the first known application require modification to improve performance thereby resulting in an updated version of the customized set of options for the first known application. The first execution profile may match a first known execution profile that is associated with a first of the known applications and included in the set of one or more predetermined execution profiles. The first application type associated with the first application may not match a predetermined application type associated with the first known application. The one or more key parameters of the set of one or more storage resources may not match one or more predetermined key parameters of storage resources included in a predetermined customized set of options for the first known application thereby indicating that the set of one or more storage resources is not configured using the predetermined customized set of options for the first known application. The first processing may include reporting information to a target location regarding the first application matching the first execution profile of the first known application whereby the first application uses the set of one of more storage resources not configured using the predetermined customized set of options for the first known application; and determining whether one or more predetermined key parameters of storage resources included in the customized set of options for the first known application require modification to improve performance thereby resulting in an updated version of the customized set of options for the first known application. The first execution profile may match a first known execution profile that is associated with a first of the known applications and included in the set of one or more predetermined execution profiles, and the first application type associated with the first application may match a predetermined application type associated with the first known application. The one or more key parameters of the set of one or more storage resources may match one or more predetermined key parameters of storage resources included in a default set of options not customized for the first known application thereby indicating that further processing is needed to determine whether a predetermined customized set of options for the first known application requires modification. The first execution profile may not match any of the set of one or more predetermined execution profiles thereby indicating that the first application is not one of the known applications. The first processing may include reporting first information to a target location, said first information including the first execution profile and one or more key parameters of the set of one or more storage resources, said first information indicating that the first execution profile does not match any of the set of one or more predetermined execution profiles thereby indicating that the first application is not one of the known applications; and determining, using the first execution profile and one or more key parameters of the set of one or more storage resources, a new predetermined customized set of options for the first application. The one or more predetermined parameters identifying one or more customized configuration options for a known application may include any of a RAID protection level, a RAID layout configuration including a number of data members and parity members, one or more data storage tiers to be used in connection with storing data for the application, an indicator as to whether it is allowable for data of the application to be automatically migrated between storage tiers, an indicator as to whether to data for the application is stored on a virtually provisioned device, an indicator as to whether to perform compression when storing data of the application, an indicator as to whether to perform encryption when storing data of the application, an indicator as to whether to perform deduplication when storing data of the application, a storage tier of physical devices for storing application data, a type of physical device for storing application data, and a size for a storage resource.

In accordance with another aspect of the invention is a system comprising: one or more application servers, wherein one or more applications execute on each of said application servers; a data storage system including one or more storage resources used by each of said applications executing on the application servers; and a computer readable medium comprising code stored thereon which, when executed by a processor, performs processing including: monitoring I/O operations received at the data storage system from a first of the applications, said I/O operations being directed to a set of one or more storage resources; collecting, in accordance with said monitoring, first information characterizing the I/O operations from the first application; determining, using the first information, a first execution profile for the first application characterizing I/O operations of the first application; determining whether the first execution profile of the first application matches any of a set of one or more predetermined execution profiles for one or more known applications, each of said one or more predetermined execution profiles characterizing I/O operations of one of the known applications; and performing first processing in accordance with one or more criteria, said one or more criteria including whether the first execution profile matches any of the set of one or more predetermined execution profiles.

In accordance with another aspect of the invention is a computer readable medium comprising codes stored thereon for analyzing storage resources, the computer readable medium comprising code stored thereon for: monitoring I/O operations received at a data storage system from a first application, said I/O operations being directed to a set of one or more storage resources; collecting, in accordance with said monitoring, first information characterizing the I/O operations from the first application; determining, using the first information, a first execution profile for the first application characterizing I/O operations of the first application; determining whether the first execution profile of the first application matches any of a set of one or more predetermined execution profiles for one or more known applications, each of said one or more predetermined execution profiles characterizing I/O operations of one of the known applications; and performing first processing in accordance with one or more criteria, said one or more criteria including whether the first execution profile matches any of the set of one or more predetermined execution profiles. The first execution profile may include any of a size of a write operation, a size of a read operation, an average size of a read operation, an average size of a write operation, a maximum size of a read operation, a maximum size of a write operation, a percentage, mixture, or ratio of read to write operations, a percentage or ratio of reads that are sequential, a percentage or ratio of reads that are random, a total number of I/O operations/time period, a number of read operations/time period, a number of write operations/time period, and an average size of an I/O operation determined for a time period. The computer readable medium may include code for collecting information on key parameters of the set of one or more storage resources and wherein said criteria includes whether one or more of the key parameters of the set of one or more storage resources match one or more predetermined key parameters of storage resources included in a customized set of options for one of the known applications and whether a first application type associated with the first application matches a predetermined application type associated with one of the known applications. The first execution profile may match a first known execution profile that is associated with a first of the known applications and included in the set of one or more predetermined execution profiles, and wherein the first application type associated with the first application may match a predetermined application type associated with the first known application and wherein the one or more key parameters of the set of one or more storage resources may match one or more predetermined key parameters of storage resources included in a customized set of options for the first known application thereby indicating that the customized set of options was previously used in connection with provisioning the set of one or more storage resources. The criteria may include whether observed performance of the first application is in accordance with expected performance associated with the first known application. The computer readable medium may include code for collecting, in accordance with said monitoring, performance data for the first application, said performance data including a first metric providing a measure of performance for the first application; and determining whether the performance data for the first application is in accordance with one or more expected thresholds associated with the first known application. If the performance data for the first application is not in accordance with the one or more expected thresholds associated with the first known application, said first processing may include reporting information regarding the first application and the performance data for the first application not being in accordance with the one or more expected thresholds associated with the first known application to a target location; and determining whether one or more predetermined key parameters of storage resources included in the customized set of options for the first known application require modification to improve performance thereby resulting in an updated version of the customized set of options for the first known application. The first execution profile may match a first known execution profile that is associated with a first of the known applications and included in the set of one or more predetermined execution profiles, and wherein the first application type associated with the first application may not match a predetermined application type associated with the first known application and wherein the one or more key parameters of the set of one or more storage resources may not match one or more predetermined key parameters of storage resources included in a predetermined customized set of options for the first known application thereby indicating that the set of one or more storage resources is not configured using the predetermined customized set of options for the first known application. The first processing may include reporting information to a target location regarding the first application matching the first execution profile of the first known application whereby the first application uses the set of one of more storage resources not configured using the predetermined customized set of options for the first known application; and determining whether one or more predetermined key parameters of storage resources included in the customized set of options for the first known application require modification to improve performance thereby resulting in an updated version of the customized set of options for the first known application. The first execution profile may not match any of the set of one or more predetermined execution profiles thereby indicating that the first application is not one of the known applications, and wherein said first processing may include reporting first information to a target location, said first information including the first execution profile and one or more key parameters of the set of one or more storage resources, said first information indicating that the first execution profile does not match any of the set of one or more predetermined execution profiles thereby indicating that the first application is not one of the known applications; and determining, using the first execution profile and one or more key parameters of the set of one or more storage resources, a new predetermined customized set of options for the first application.

BRIEF DESCRIPTION OF THE DRAWINGS

Features and advantages of the present invention will become more apparent from the following detailed description of exemplary embodiments thereof taken in conjunction with the accompanying drawings in which:

FIG. 7 is an example of different cases and associated criteria and actions that may be used in an embodiment in accordance with techniques herein.

DETAILED DESCRIPTION OF EMBODIMENT(S)

Figure 1:
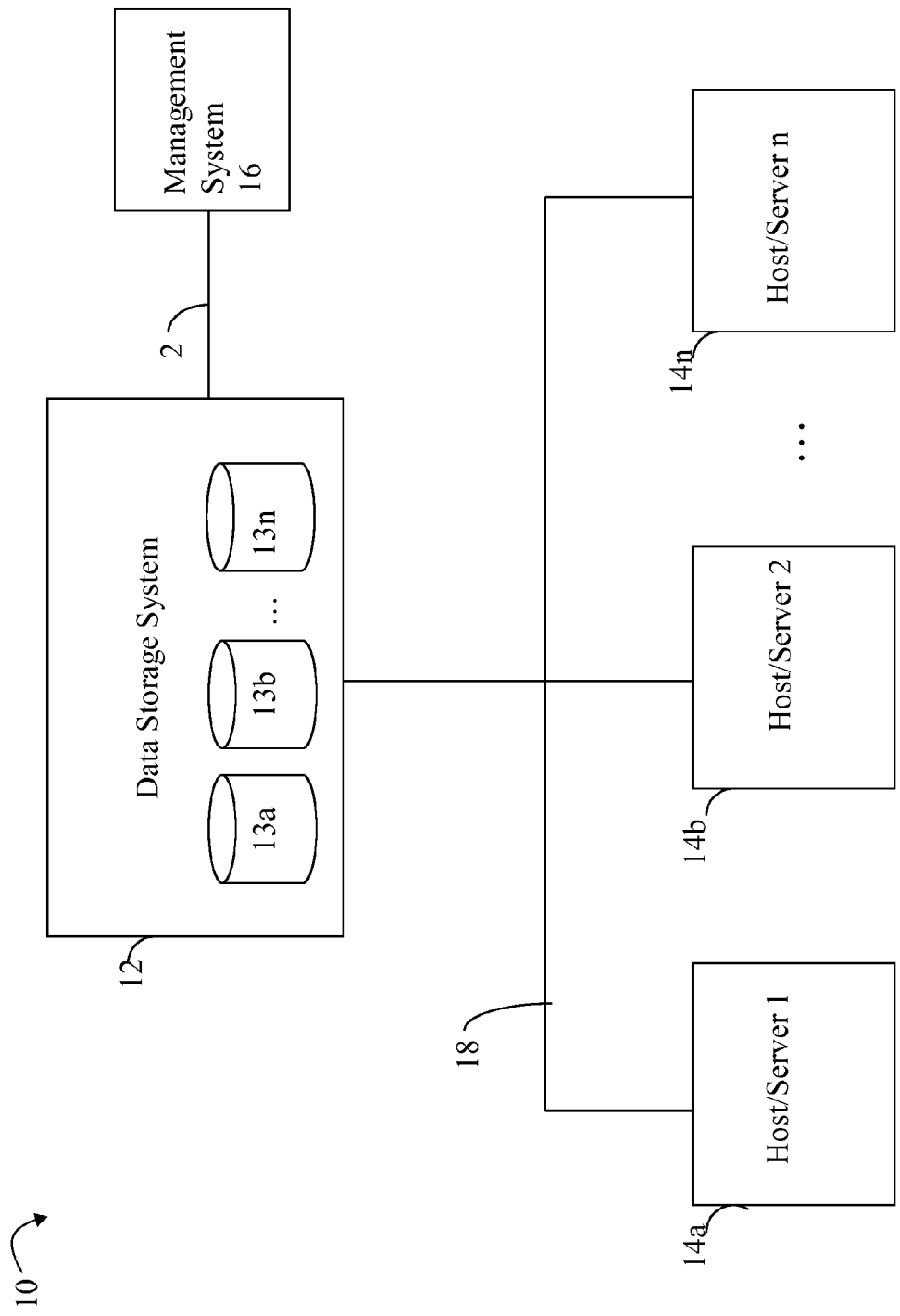
FIG. 1 is an example of an embodiment of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices or switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems, such as data storage arrays, offered by EMC® Corporation of Hopkinton, Mass. For example, an embodiment in accordance with techniques herein may include the VNXe™ storage system by EMC® Corporation. Each of the data storage systems may include one or more data storage devices 13a-13n, such as disks. One or more data storage systems may be manufactured by one or more different vendors. Each of the data storage systems included in 12 may be inter-connected (not shown). As mentioned above, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
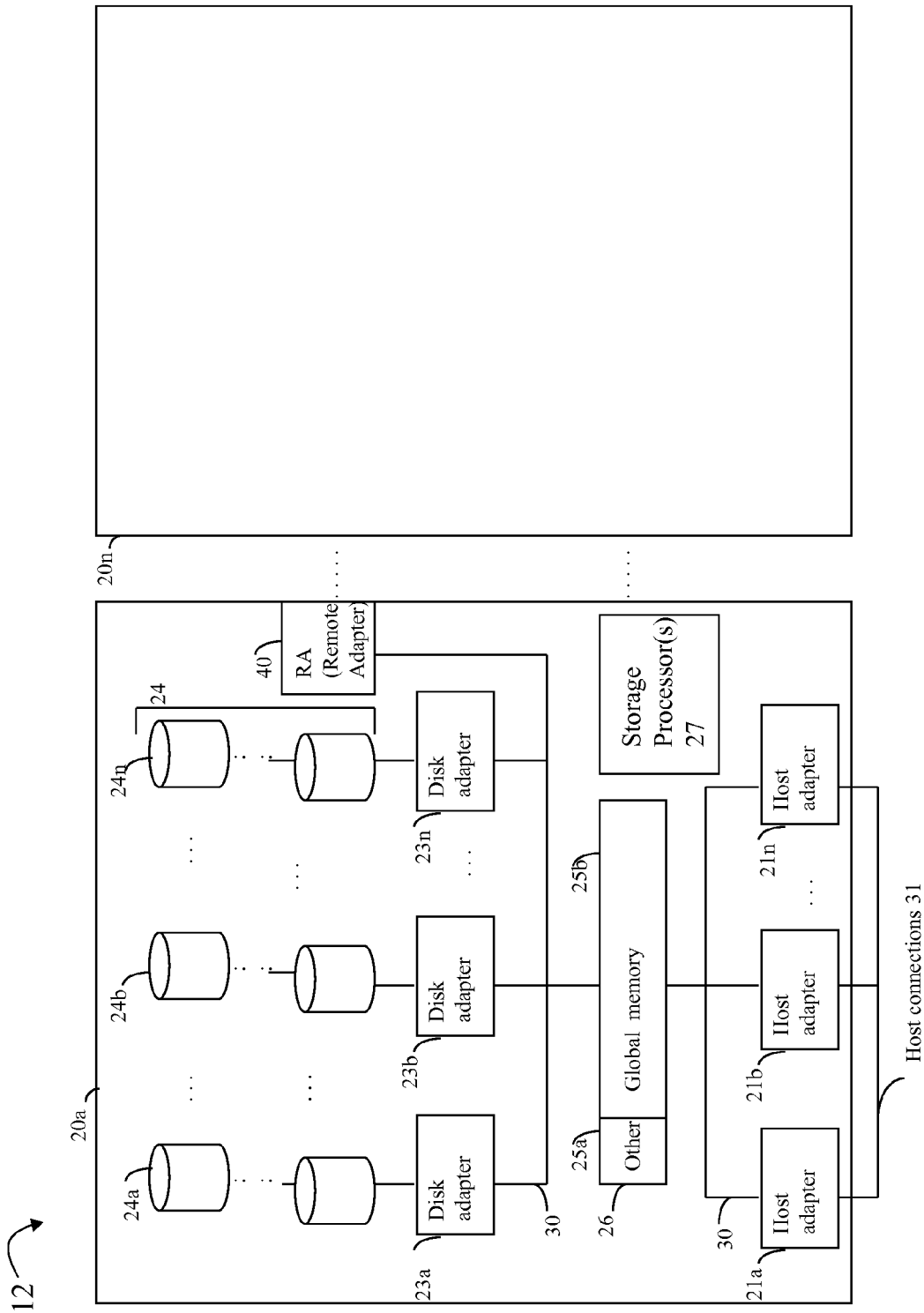
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. It should be noted that elements 24a-24n generally represent one or more different data storage devices analogous to elements 13a-13n of FIG. 1. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more storage processors 27. Each of the storage processors 27 may be CPU and an embodiment may include any number of such processors. For example, the VNXe™ data storage system by EMC Corporation includes two storage processors. The system 20a may also include one or more host adapters ("HAs") or directors 21a-21n. Each of the HAs may be used to manage communications and data operations between one or more host systems and the memory 26. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs (remote adapters), and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. In some embodiments of a data storage system, the memory 26 may be partitioned into two or more portions such as a global memory portion 25b and one or more other portions 25a. For example, in some embodiments of a data storage system including a single storage processor 27, the global memory portion 25b may be used to facilitate data transfers and other communications between the DAs, HAs and RAs in a data storage system. The DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, an embodiment of a data storage system, such as the VNXe™ data storage system by EMC Corporation, may include multiple storage processors each with their own memory used for communication between the different front end and back end components rather than utilize a global memory accessible to all storage processors. In such embodiments, memory 26 may represent memory of each such storage processor.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

An embodiment of a data storage system may include software that performs application aware provisioning such as described, for example, in U.S. Pat. No. 7,523,231, issued Apr. 21, 2009, entitled APPLICATION AWARE STORAGE, which is incorporated by reference herein. Such techniques provide the storage administrator or other user configuring storage for an application with one or more sets of application-specific best practices for provisioning storage resources. As described in more detail herein, such best practices may be characterized as a set of options customized for a particular application for use in connection with provisioned storage resources for that particular application. A user may select one of the sets of best practices when provisioning storage for the particular supported application. For example, supported applications may include one or more particular electronic mail application servers, such as Microsoft™ Exchange Server, or a particular database application server. An embodiment may include one or more sets of generic options provisioning storage for generic storage resources. Such generic options may be used, for example, when provisioning storage for an application for which a set of best practices of customized set of options is not also provided. For example, a first generic storage resource may be a generic logical disk or generic LUN having a set of defaults specified such as predetermined RAID configuration or level, predetermined physical drive characteristics, and the like. Another example of a generic storage resource may be a generic file system similarly having a set of predetermined configuration options. In this manner, a user provisioning storage for an application for which best practices or customized application-specific options are not provided may alternatively select one of the generic storage resources.

Application best practices specify, for example, storage resource topology (e.g., how many LUNs are needed and whether such LUNs should be in the same or different RAID group or pool, size and protection recommendations, translation of application-specific parameters (e.g. number of mailboxes for Microsoft Exchange) into storage resource parameters (e.g., physical device types, RAID type, whether deduplication is performed, and the like) and application aware integration. Best practices which are either customized for a particular application or which are used in specifying a more general or generic provisioned storage resource may be determined based on marketing analysis by product marketing group and test deployments in the laboratory by solution engineers. Thus, best practices determined may be based on acquired knowledge through experience and know-how of skilled persons. The sets of best practices and best practices themselves may become obsolete, for example, as new applications are introduced in the market and/or there are modifications or improvements made to a supported application, changes in drive technology, and changes to the data storage systems themselves.

An embodiment may collect information regarding which application-specific best practices are actually used or selected for provisioning storage resources. Additionally, as described in more detail below, an embodiment in accordance with techniques herein may collect information regarding how provisioned storage resources are actually utilized and how well implementation of the best practices actually works (e.g., what is the resulting I/O performance for I/Os of a supported application using storage resources provisioned using the best practices customized for the particular application).

As described in following paragraphs, techniques herein may be used to monitor how provisioned resources are actually used. For example, if a customer selects one of the best practices options for a generic storage resource, such as one of the generic LUN or generic file system, techniques herein may be used to determine how the provisioned generic resources are actually used (e.g., by what application). For example, if storage is provisioned using the generic LUN/LV or generic file system, monitoring may be performed using the techniques herein to identify what applications actually use the generically provisioned resources. Such customer usage may indicate that another "new" application specific best practices module or profile is needed if not already included in a set of best practices. For example, application best practices may not currently include application best practices for an application such as a particular database or email application. Thus the application may not currently be a supported application for which application-specific best practices are provided. Rather, customers may configure storage for the application using generic storage resources such as the generic LUN or file system. However, it may be that a number of existing customers use the particular database or email application and provision the application's storage using the generic LV or generic file system. By observing and identifying such use by a number of customers, a determination may be made that another application best practices profile is needed for the application rather than have the customers provision storage using the generic LV or generic file system. As another example, monitoring may be performed using techniques herein to assess the resulting performance of using any of the existing or current best practices for a particular application. In this manner, a determination may be made as to whether a customized set of best practice options for a supported application actually results in obtaining expected performance on a customer's system. In this manner, monitoring may be used to assess how well the "best practices" customized for an application perform such as may be measured in terms of one or more performance metrics. If performance is not within expected or acceptable performance thresholds, processing may be performed to further assess the cause of the unacceptable performance. For example, there may have been a change to the application, data storage system, customer storage environment, and the like, for reasons other than correctable errors or problems particular to a customer. Such unacceptable performance experienced by a large number of customers for a particular supported application for which best practices are provided may indicate that the best practices require modification or updating.

Before describing such techniques, reference is made to an initial discussion of how physical storage devices may be configured for use by an application in one embodiment. In such an embodiment, physical devices may be configured into one or more storage pools.

The physical storage devices of the data storage system may be configured or partitioned into storage pools. An embodiment may form one or more such storage pools for use in connection with servicing a provisioning request prior to the issuance of the provisioning request. In other words, the physical storage devices may be configured into one or more storage pools at a first point in time. At a second later point in time, storage may be allocated from the previously formed storage pools in connection with a provisioning request to allocate storage for use with an application hosting data on the data storage system. Storage pools may be formed at different points in time in connection with the life cycle of a data storage system. For example, storage pools may be formed as part of data storage system initialization and startup processing and when new data storage devices are added to a data storage system. An embodiment may also form storage pools from only a portion of storage devices at a first point in time and then later configure additional storage devices. Additionally, an embodiment may also reconfigure storage devices. For example, a first physical device may initially be configured for use in a first storage pool. At a later point in time, the first physical device may be reconfigured for use with a second storage pool.

Figure 3:
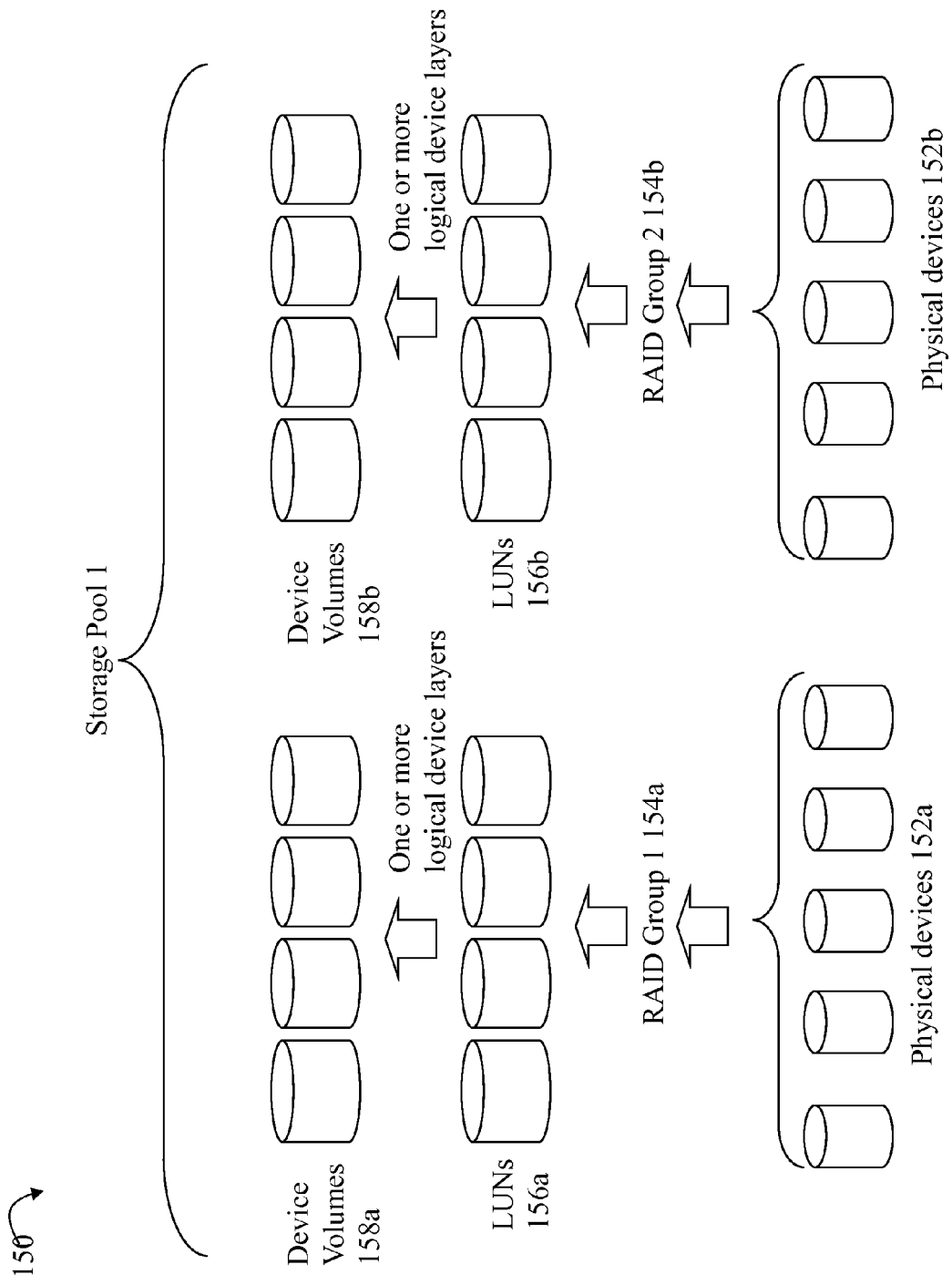
FIG. 3 is an example illustrating how storage pools may be configured in an embodiment in accordance with techniques herein.

Referring to FIG. 3, shown is an example representing how storage pools may be formed from physical devices in an embodiment in accordance with techniques herein. The example 150 illustrates how storage pools may be constructed from groups of physical devices. For example, RAID Group1 154a may be formed from physical devices 152a. A storage pool may have a particular RAID level and RAID configuration or layout for the type of storage pool being formed. For example, for physical devices 152a on a first data storage system type when forming a storage pool, RAID-5 may be used in a 4+1 configuration (e.g., 4 data drives and 1 parity drive). The RAID Group 1 154a may provide a number of data storage LUNs 156a. An embodiment may also utilize one or more additional logical device layers on top of the LUNs 156a to form one or more logical device volumes 158a. The particular additional logical device layers used, if any, may vary with the data storage system. It should be noted that there may not be a 1-1 correspondence between the LUNs of 156a and the volumes of 158a. In a similar manner, device volumes 158b may be formed or configured from physical devices 152b. The storage pool 1 of the example 150 illustrates two RAID groups being used to define a single storage pool although, more generally, one or more RAID groups may be used to form a storage pool in an embodiment using RAID techniques.

As mentioned above, the application best practices used in an embodiment may be determined based on experience, know how, testing and the like, in connection with provisioning storage for a particular application. Application specific best practices may be characterized as one or more configuration options customized for use with data storage for the particular application. To illustrate, the configuration options used for configuring data storage for use with an application may vary with a particular email application, database application, and the like. The application best practices may be codified to provide for automatically specifying options for many data storage management tasks including, for example, provisioning data storage system resources, selecting and implementing data protection services including a backup schedule, and the like. An embodiment may implement the application best practices using executable code which is executed on the data storage system. The application best practices may provide for selection of data storage configuration options which may be automatically implemented.

In accordance with techniques herein, a monitoring component or monitor may be included in the data storage system to collect and analyze information regarding the provisioned storage resources and aspects regarding resulting performance. The monitor may collect information on key parameters of provisioned storage resources (e.g., whether and what, if any, best practices (generic or customized for an application) as provided with the system were used to configure the storage resources, topology, sizes, physical device type, RAID configuration and/or level, and the like) and key characteristics of I/O (e.g., read and write) operations performed by the application to the provisioned storage resources. As used herein the key characteristics expected or observed for I/O operations of an application may also be referred to as an application fingerprint, I/O execution profile or I/O pattern for the application. Such key characteristics of the I/O operations for a particular application may include, for example, read/write operations sizes, I/O mix (% or ratio of read and writes), I/O sizes observed (e.g., for reads and/or writes, sizes may be average, maximum, expected range), whether reads are primarily sequential (e.g., above a predetermined threshold), a percentage of what reads performed are sequential (as opposed to random reads), and the like. In an embodiment, the key parameters of the provisioned storage resources may be those specified in connection with previously provisioning the storage resources for use by the application. For example, when the storage resources were provisioned, a storage administrator may have used a user interface with a dialogue to input information used to configure the storage resources for the application. Such information input by the storage administrator may include information regarding the application or application type for which storage resources were provisioned, input(s) indicating whether to use best practices or predetermined customized options for the application, input(s) indicating whether to use options for a generic storage resource (such as a generic LUN or generic file system) and associated options for the generic storage resource, and the like. Additionally, the monitor may collect performance data used to characterize the observed performance achieved in connection with the I/Os of the application directed to the provisioned resources.

As described in more detail below, collected information such as regarding the key parameters of the provisioned resources, key characteristics of an observed application fingerprint or I/O execution profile, and observed performance may be compared to expected or predetermined values for known applications. For example, as set forth below, the techniques herein may be used to analyze the I/Os received from an application on an I/O or data path to determine an associated I/O pattern or observed application fingerprint. The observed application fingerprint may then be compared to one or more predetermined application fingerprints associated with known applications to determine whether the observed application fingerprint matches that of a known application (thereby providing evidence that an observed application is an instance of the known application). Such comparison, along with other processing described in more detail below, may be used in connection with identifying a need for improvements to existing application best practices for supported applications and for identifying new or additional applications for which a new set of best practices or application-specific customized options should be provided (since a set of such best practices for the application is not currently provided).

As mentioned above, customization of storage configuration options may be based on I/O patterns detected through observing or monitoring I/O activity. For example, the data storage system may determine one or more I/O metrics derived from observing I/O activity directed to a LUN. The I/O-related metrics may provide an I/O activity profile or workload for the LUN. The metrics may include, for example, one or more of I/O throughput or frequency (e.g., total number of I/Os per unit of time), frequency of read operations (e.g., reads/second or other unit of time), frequency of write operations (e.g., write/second or other unit of time), ratio of read to write operations, average size of I/Os (e.g., average size such as in bytes of read operations, write operations, read and writes in combination), an amount of I/O operations (e.g., reads, writes, or combination of reads and writes) which are sequential and/or random, and the like. An I/O pattern may include one or more of the foregoing metrics. Additionally, an I/O pattern may also include an observed sequence of one or more I/O operations. For example, consider a database application. The application may perform one or more I/O operations to a first LUN storing the database data followed by a write operation to a second LUN upon which the database transaction log is stored. The write to the transaction log may always be a particular size. As such, the I/O pattern which is characteristic or signature of the database application may include 100% sequential writes of the particular size to the second LUN. Additionally, the I/O pattern includes the sequence of I/O operations where the writes to the second LUN for the log are interspersed between other I/O operations to the first LUN.

Based on the foregoing, an observed I/O pattern may be compared to a set of predetermined or known I/O patterns defining characteristic, expected I/O patterns for applications. A determination may be made as to whether the observed I/O pattern matches, or is similar, to an expected I/O pattern for an application.

Additionally, as noted above, one or more performance metrics may be used to characterize a level of expected or threshold performance for an application using the best practices. Data collected through observation for an observed application may be compared to such expected or threshold performance levels to determine whether the particular application instance observed which implements the best practices achieves the level of expected performance. If not, it may be that further analysis is required to determine whether modification of best practices for the application is needed. Examples of performance metrics include response time, latency, I/O throughput, I/O bandwidth or date transfer rate, and the like.

Figure 3A:
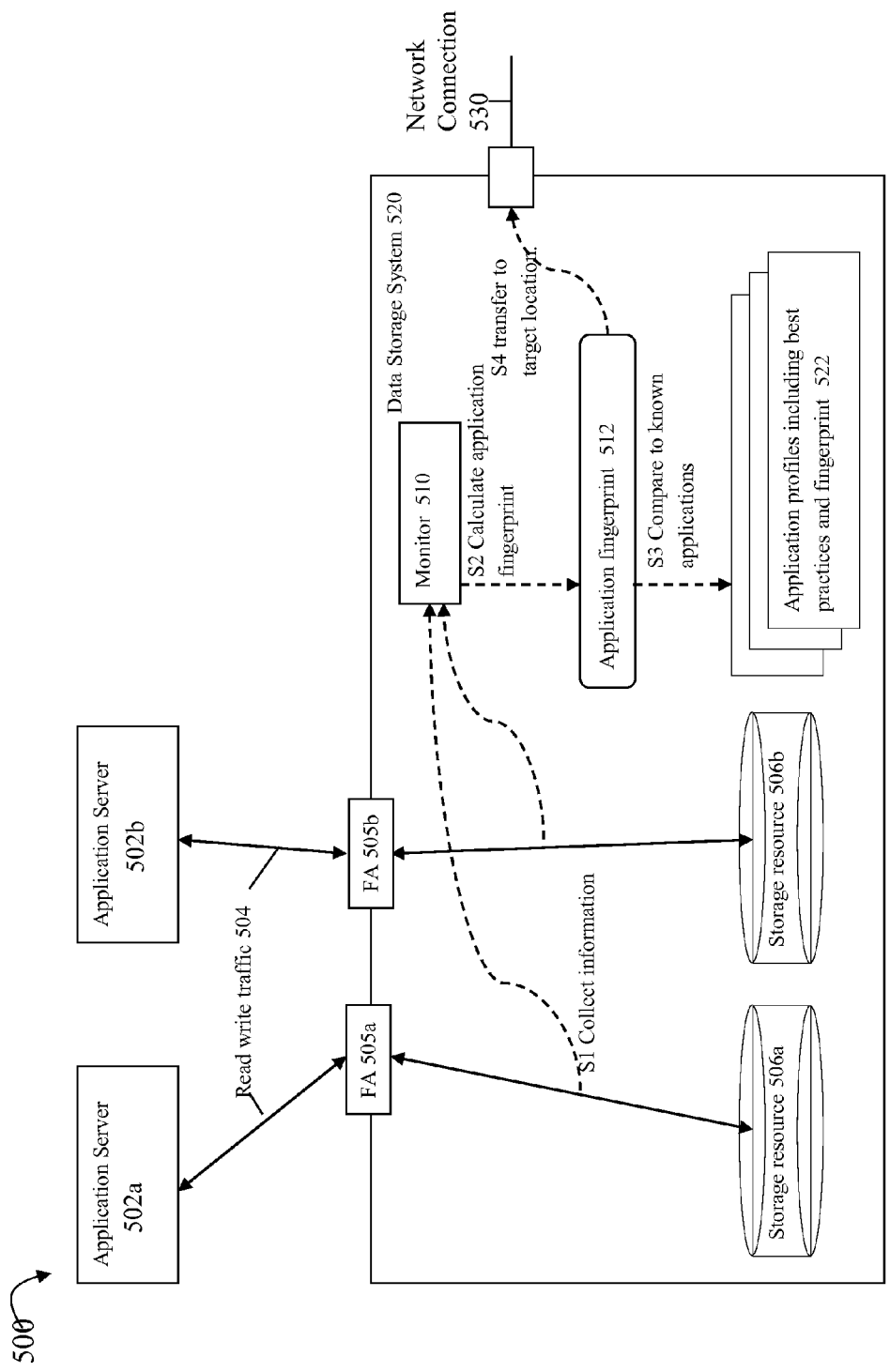
FIG. 3A is an example of components that may be included in an embodiment in accordance with techniques herein.

Referring to FIG. 3A, shown is an example of components that may be included in an embodiment using the techniques herein. The example 500 includes application servers 502a, 502b which may include one or more applications issuing I/Os to the data storage system 520. Elements 502a, 502b are analogous to the hosts or servers such as described above in connection with FIGS. 1 and 2. The read/write traffic 504 may represent the I/Os issued from the servers 502a, 502b to the data storage system 520. The I/Os may be received at front end components (or ports of such components), such as at FAs 505a, 505b, of the data storage system 520. The I/Os may be directed to one or more storage resources, such as 506a and 506b. The storage resources 506a, 506b may be, for example, LUNs or file systems such as described elsewhere herein. Each of the storage resources, such as each of 506a, 506b, may be provisioned for use in connection with a particular application. For example, storage resource 506a may be provisioned for use with a first application issuing I/Os from application server 502a, and storage resource 506b may be provisioned for use with a second particular application issuing I/Os from application server 502b. The particular first and second applications and the resources used by the particular application may have been previously identified and configured as part of a dialogue when the storage administrator provisioned the resources for use with the applications. For example, when provisioning resource 506a for use by a first application, the storage administrator may have entered information identifying the first application, selecting whether to use a set of best practices for the first application, generic storage resource and associated options, and the like, when the storage resource 506a was provisioned. In this manner, the data storage system may have information regarding the application or application type which is using the provisioned resource(s).

The example 500 includes a monitor component or monitor 510 which may include functionality as described above and also in more detail below. As illustrated by S1, the monitor 510 may collect information on key parameters of the storage resources 506a, 506b, key characteristics of the observed I/O operations and one or more performance metrics. As illustrated by S2, the monitor 510 may analyze the collected information and, as an output of such analysis, may calculate an application fingerprint 512 identifying the I/O execution profile or I/O pattern of the observed I/Os for an application. The application fingerprint 512, along with other information observed, may be compared (S3) to one or more predetermined sets of information of known applications. Such information regarding known applications is represented by element 522. As described in more detail below, an embodiment may include a set of application profiles for supported applications. Each of the application profiles may include information for a supported application for which best practices or application-specific customized options are provided. The results of such comparisons, along with the observed application fingerprint and possibly other collected information, may be provided (S4) to a target location. The target location may be, for example, an IP address or internet location of a data storage vendor, such as EMC Corporation, which provides the application profiles and best practices for one or more supported applications used by its customers. The information may be provided by the system 520 to a target location such as over network connection 530. As described in more detail below, the information provided to the target location may be used, for example, in connection with identifying new applications for which best practices should be provided but are not, creating new application profiles including best practices for new, additional applications, and improving best practices as included in existing application profiles for currently supported applications.

Figure 4:
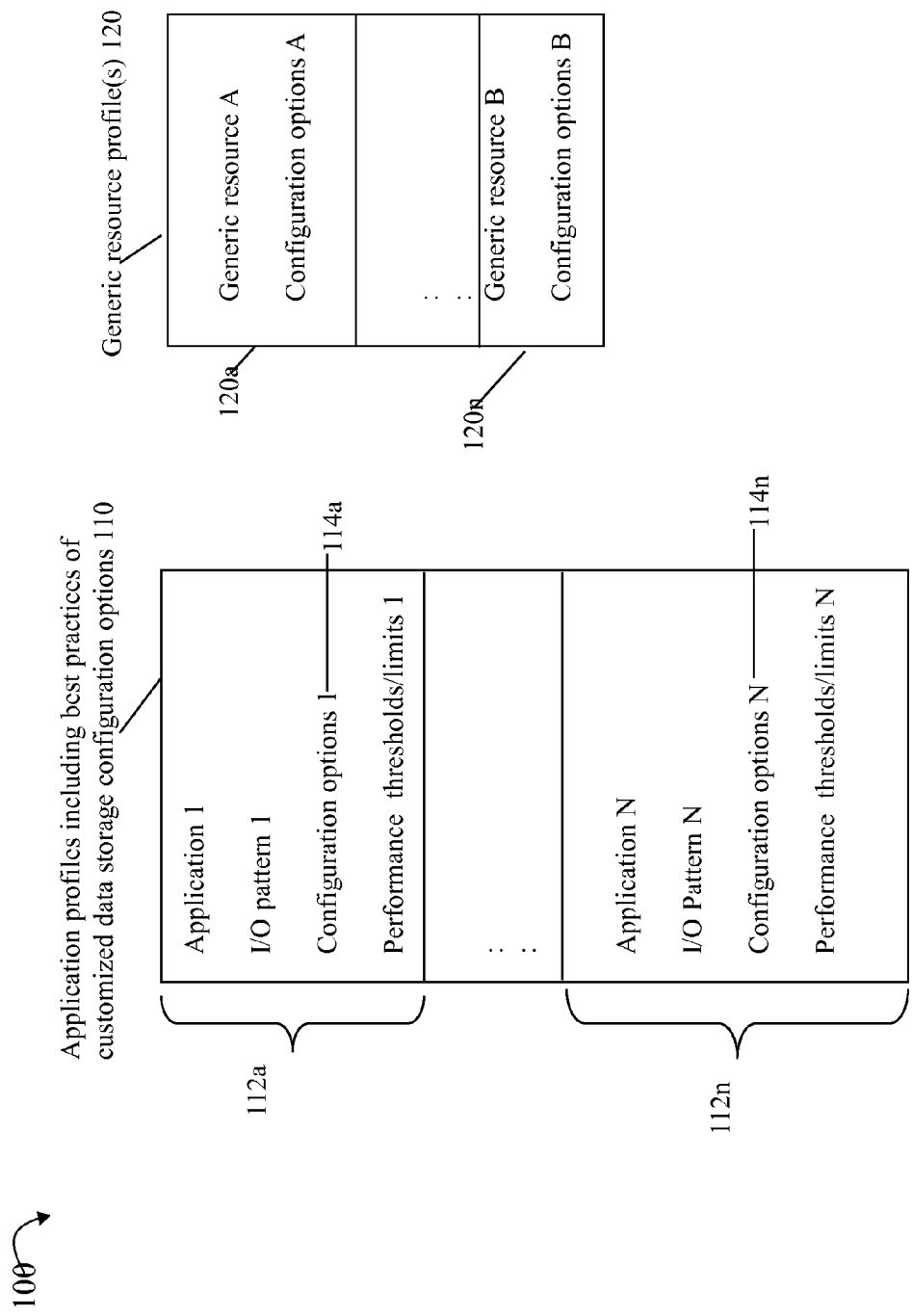
FIG. 4 is an example of application profiles and generic profiles that may be used in an embodiment in accordance with techniques herein.

Referring to FIG. 4, shown is an example of information that may be used in an embodiment in accordance with techniques herein. The example 100 includes application profiles 110. The application profiles 110 include best practices of customized data storage configuration options for N applications. Each of the N applications (N>0, denoted as 112a . . . 112n) may have a corresponding record or entry in 110. Table 110 may also be referred to as application profile information including an instance for each supported application for which best practices are provided. Entry 112a identifies an application type (e.g., category denoting one or more applications) or a particular application (e.g., Application 1 which may denote a particular electronic or email application, such as Microsoft Exchange, or a particular database application, such as an SQL database server application), an expected I/O pattern, profile or fingerprint (e.g., I/O pattern 1), a set of one or more configuration options (e.g., configuration options 1) customized for the application in accordance with application best practices, and a set of performance thresholds or limits for the application. In a similar manner, each entry of 110 may include information for a different one of the N applications.

Additionally, the example 100 includes one or more generic resource profiles 120 that may be used for provisioning generic storage resources. Examples of generic storage resources may include a generic LUN and a generic file system each having a generic resource profile. Generally, the generic resource profiles include configuration options specified for general usage without tuning or customization for a specific application. Generic resources may be used in connection with provisioning storage for an application, for example, if there is no application profile of best practices for the application or if the storage administrator chooses to otherwise not utilize an existing set of best practices for the application.

Figure 5:
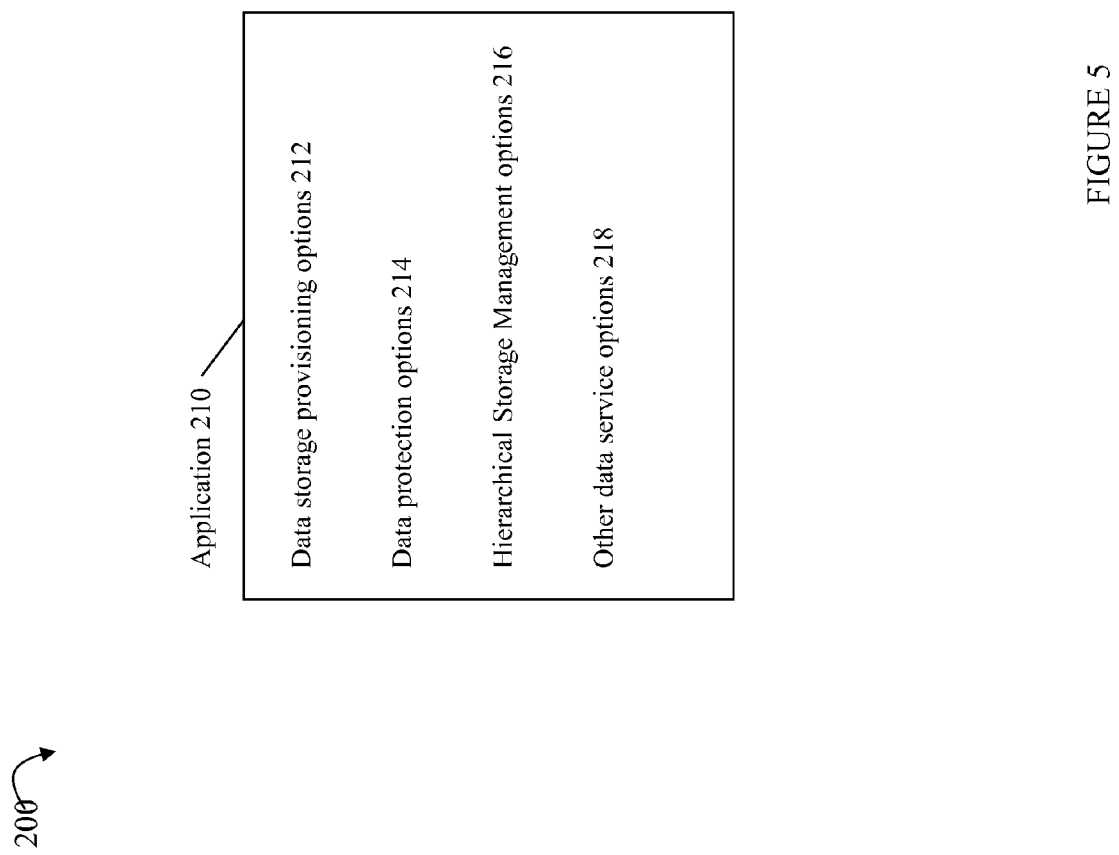
FIGS. 5 and 6 are examples illustrating I/O patterns, configuration options, and performance thresholds that may be specified for one or more applications in an embodiment in accordance with techniques herein.

Referring to FIG. 5, shown is an example of categories of customized configuration options that may be used in connection with an application in accordance with techniques herein. The example 200 illustrates exemplary configuration options for data services that may be used in connection with an application 210 where the options are customized or selected for the particular application 210. Options described in connection with element 210 may be specified for each entry and associated application represented by 110 of FIG. 4. Such options may be specified, for example, in connection with 114a or 114n of FIG. 4. Additionally, a set of such options as illustrated in FIG. 5 as specified for an application may also be specified for a generic resource profile without customization for a particular application.

Generally, data services may include any service that transforms or utilizes the data and/or the storage of the data. In connection with an embodiment herein, the data services may be applicable at the LUN and/or storage pool level. Exemplary categories of data services may include data storage capacity or provisioning, data protection, hierarchical storage management and other data service options. Configuration options selected or customized for the application 210 are represented for each of the foregoing categories in the example 200 where the configuration options may include data storage capacity or provisioning options 212, data protection options 214, hierarchical storage management options 216 and other data service options 218.

Storage capacity/provisioning data services may include services to configure and allocate storage for use by the application. Examples of options 212 may specify, for example, a particular RAID protection level (e.g., RAID 0, 1, 2, 5, 6, 10, etc.), a particular RAID layout (e.g., for a particular RAID level such as RAID-5, a number of data drives and parity drives), a minimum amount of storage in a storage pool or LUN, a preferred storage category such as an attribute of a storage pool or a LUN, and the like. As another example of a storage pool attribute or property, a storage category for a storage pool may indicate whether to store application data in a CHEAP or HIGH PERFORMANCE storage pool. CHEAP and HIGH PERFORMANCE may be possible abstractly defined storage pool attributes. HIGH PERFORMANCE storage may be defined as a general category of high performance (e.g., "fast") storage based on one or more different data storage system-specific properties which are used to characterize the storage pool. The particular properties and associated values used to define a HIGH PERFORMANCE storage pool as well as other storage pools may vary with the underlying data storage system. For example, a HIGH PERFORMANCE storage pool may include physical storage devices such as flash-based storage (or more generally solid state storage devices) or FC rotating disk drives having a higher performance relative to other types of storage devices (e.g., SATA, SAS, or other rotating disk drives) that may be included in a storage system. As with HIGH PERFORMANCE storage pools, CHEAP may be an abstract property based on one or more data storage specific properties and values that vary with the underlying data storage system. The particular properties and values used to characterize and define a CHEAP storage pool may vary with data storage system. CHEAP may refer to a second type of data storage which may be characterized as inexpensive and not as fast in connection with servicing I/O requests relative to the storage pools of type HIGH PERFORMANCE. In contrast to CHEAP storage pools, storage pools of type HIGH PERFORMANCE may consist of faster device types and device configurations which may typically result in faster I/O request service times. Other embodiments may use a different number and different types or categories of storage pools other than HIGH PERFORMANCE and CHEAP. To further illustrate, a first storage pool may have the HIGH PERFORMANCE attribute and may be defined as using Fibre Channel rotating disk drives in a RAID-10 configuration of device pairs. A second storage pool may have the HIGH PERFORMANCE attribute and may be defined as using Fibre channel rotating disk drives or flash-based (solid state drives) with a RAID-5 (4 data drives+1 parity drive) configuration. A third storage pool may have the CHEAP attribute and be defined as using SATA rotating drives with a RAID-5 (8 data drives and 1 parity drive) configuration. In accordance with techniques herein, configuration options of 212 may identify the particular RAID level and/or physical drive characteristics associated with a LUN and/or storage pool. The options of 212 may also identify an abstractly defined type such as CHEAP and/or HIGH PERFORMANCE associated with a storage pool.

Data protection services may include, for example, providing data backups, encryption services, data replication (local in same data storage system and/or remote at another physically remote data storage system), and the like. Example options of 214 may indicate whether to perform encryption, whether to perform a data backup and if so options for a backup schedule (e.g., frequency of backups, whether backups are complete, partial or differential), whether to perform local data replication in the same data storage system, whether to perform remote data replication such as using a form of RDF (remote data facility) as offered by EMC Corporation of Hopkinton, Mass., and the like.

Hierarchical storage management services may provide services for managing the storage devices in an embodiment which includes multiple tiers and/or types of data storage. Hierarchical storage management services may include, for example, moving data between different types of data storage devices such as between a fibre-channel rotating disk, an SSD or solid state drive and an ATA (Advanced Technology Attachment) rotating disk drive, between one of the foregoing disks and a tape, between different defined storage tiers, and the like. In connection with hierarchical storage management configuration options, an embodiment may indicate whether or not to utilize such services. If such services are used, the options 216 may indicate options customized for the particular application. For example, one embodiment of a data storage system may provide for different defined storage tiers. Software that may be used in connection with performing hierarchical storage management is, for example, a Fully Automated Storage Tiering (FAST) product by EMC Corporation of Hopkinton, Mass., that provides for the optimization and use of different storage tiers including the ability to easily create and apply tiering policies to transparently automate the control, placement, and movement of data within a storage system based on business needs. Each tier may generally include physical storage devices or drives having one or more attributes associated with a definition for that tier. For example, an embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive, and the like. Data protection may specify a type or level of data storage protection such, for example, as a particular RAID level (e.g., RAID1, RAID-5 3+1, RAID5 7+1, and the like). Performance characteristics may relate to different performance aspects of the physical storage devices of a particular type or technology. For example, there may be multiple types of magnetic disk or spinning media type of FC drives based on the RPM characteristics of the FC drives (e.g., 10K RPM FC drives and 15K RPM FC drives) and FC drives having different RPM characteristics may be included in different storage tiers. Storage capacity may specify the amount of data, such as in bytes, that may be stored on the drives. An embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC drives which are a type of magnetic disk or other spinning media type, and a third tier of all SATA (Serial Advanced Technology Attachment) drives which are a type of magnetic disk or other spinning media type. The foregoing are some examples of tier definitions and other tier definitions may be specified. In such an embodiment having different storage tiers, the services associated with hierarchical storage management may provide for movement of data between storage tiers such as based on one or more I/O rate metrics (e.g., store data which has a high rate of I/O access to an SSD tier and store other data have a relatively lower I/O rate to another storage tier having slower driver performance characteristics). For example, an application's data stored on a LUN may be migrated from devices of a first storage tier to other devices of another tier having the same or similar attributes and performance characteristics, or to other devices of another tier having different attributes and performance characteristics depending on the purpose of the migration. Example options of 216 may include an indication as to whether storage of the application may be automatically migrated at all (e.g., disable automatic migration) or may indicate varying degrees of allowable automatic migration such as whether data of the application may be migrated between storage tiers, to another device of a same or similar storage tier (e.g., having similar performance characteristic and attributes), identify what one or more storage tiers in which data for the application may be located, and the like.

Other examples of services that may be included in an embodiment are data de-duplication techniques, thin devices, retention services which focus on preventing deleting data until a certain time period and/or automated deletion of data after a specified time period, and classification services which may index content as stored to allow for other operations such as retrieval of content based on subsequent search criteria, categorization of data content, and the like. In connection with the foregoing, data de-duplication may generally refer to techniques which attempt to reduce or eliminate redundantly storing a same portion of data. In connection with a thin device, not all portions of the thin device's logical storage space may be associated with physical storage. A thin device presents a logical storage space to one or more applications running on a host where different portions of the logical storage space may or may not have corresponding physical storage space associated therewith. Thus, an access of the logical storage space of the thin device results in either a null pointer (or equivalent) indicating that no corresponding physical storage space has yet been allocated, or results in a reference to a data device which in turn references the underlying physical storage space. With thin or virtually provisioned devices having a logical storage space/range, associated physical storage may not be allocated for the entire logical storage space when created. Rather, portions of physical storage may be allocated/deallocated and mapped/unmapped with respect to the thin device's logical storage space as needed.

Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. patent application Ser. No. 11/903,869, filed Sep. 25, 2007, DATA DE-DUPLICATION USING THIN PROVISIONING, Veprinsky et al., EMS-177US, both of which are incorporated by reference herein.

Example applications for 210 (such as may be identified in an application profile) may include, for example, an email application, a database application, a banking application, a law office application, a medical office application, and the like. Other data services, as a category or included in a broader data service category, may provide for snapshots, cloning, migration, recovery, and the like.

It should be noted that application 210 may refer to a particular application category including one or more applications. For example, 210 may refer to email applications as a category including multiple email applications from different vendors. However, as noted above, 210 may also be associated with a particular instance of an email application, such as Microsoft Exchange.

Figure 6:
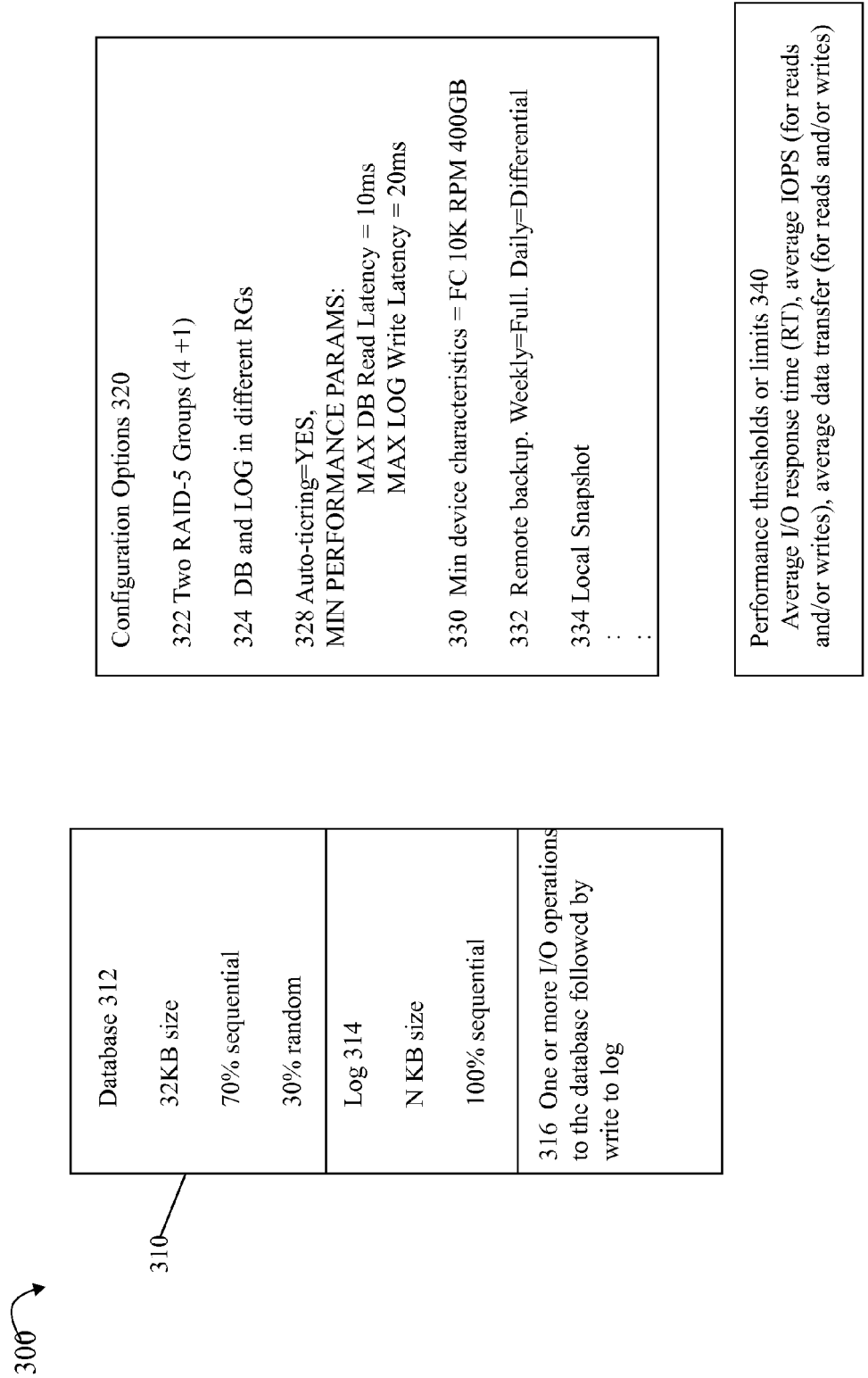

Referring to FIG. 6, shown is an example of expected I/O patterns or profiles (e.g., as may be included in an application fingerprint for a known application), configuration options, and performance limits or thresholds for an email application as may be used in an embodiment in accordance with techniques herein. The information included in the example 300 may be included in an application profile for a particular application.

The example 300 includes exemplary expected I/O patterns 310 for an email application. Such expected I/O patterns may comprise key predetermined characteristics of a known application's fingerprint. As known in the art, the email application may use a database to write user data (e.g., email content data) and a log in connection with logging transaction with respect to the database. Element 312 identifies characteristics of the expected I/O pattern for the email application with respect to the database and may include I/O operations having a 32 KB size of which 70% are sequential and 30% are random. Element 314 identifies characteristics of the expected I/O pattern for the email application with respect to the log and may include write operations having an "N" KB size which are 100% sequential. Element 316 may indicate that a typical sequence of I/O operations for the email application includes one or more I/O operations to the database followed by a write to the log. It should be noted that in connection with the foregoing and other I/O characteristics of an application, characteristics which are I/O metrics are typical and may be approximate so that when determining whether observed or measured I/O metrics obtained in real-time (e.g., when monitoring I/O operations performed at the data storage system) match or correspond to those of a particular application, an embodiment may use thresholds or ranges as may be appropriate. For example, with reference to 312, approximately 70% of the I/O operations are expected to be sequential and approximately 30% of the I/O operations are expected to be random. An embodiment may specify a range for each of the foregoing when determining whether observed I/Os have a profile matching that of 312. In contrast, ranges may not be suitable for use with other values included in 310. For example, the database I/Os of 312 may only be 32 KB in size, and the log 314 may be expected to be write only with only sequential access as indicated by the 100%.

Element 320 identifies exemplary customized configuration options for the email application as may be included in the application profile for the email application.

Element 320 may identify those options used in connection with configuring resources customized for the email application. The options 320 may indicate for the email application data storage configuration to use two RAID-5 groups having 4 data members and 1 parity member (322), store the database and log data in different RAID groups (324), and to perform automated storage tiering may be performed (328) allowing the system to automatically migrate or otherwise move email application data, for example, between devices of different storage pools having the same or different storage tiers in a multi-storage tiered environment. Also indicated by 328 are input parameters that may be used by the software performing the automated storage tiering and associated processing such as data migration. The MIN PERFORMANCE PARAMS indicate minimum performance values that the software may use in connection with performing the automated storage tiering. For the email application, the email application database and log are required to have a maximum database (DB) latency of 10 ms (average) and a maximum log write latency (average) of 20 ms. The automated storage tiering software may use the foregoing minimum performance parameters as criteria in connection with automatically configuring and/or reconfiguring what physical devices include the email application database and log data.

Element 330 includes other information that may also be input to the automated storage tiering software and includes minimum device characteristics. A storage tier selected for the email database and log data has at least these performance characteristics of 330. A storage tier may be selected in which each physical device is an FC drive having a speed of at least 10K RPM and a minimum capacity of 400 GB. It should be noted that a storage tier may be selected if it includes devices having the minimum capacity and performance characteristics which are generally considered higher performing than those of FC disk devices. For example, a storage tier may be selected for storing the email application data if the storage tier includes FC disks with 15K RPM, if the storage tier includes SSDs, and the like. Element 332 indicates that remote backup is performed for the email application data with full weekly backups and daily differential or incremental backups. Element 334 indicates that local snapshots are made of the email data on the data storage system. Element 334 may also indicate other snapshot-specific parameters. The foregoing as well as other information may be included in customized configuration options 320 for the email application.

The example 300 also includes one or more performance thresholds or limits 340. Each performance metric of 340 may indicate expected I/O performance when the customized application-specific best practices of 320 are used for provisioned storage resources. Thus, it is expected that actual observed performance data for an application which issues I/Os to storage resources configured using options 320 meets the performance thresholds or limits of 340. An embodiment may include in 340 one or more performance metrics such as, for example, average I/O response time (RT), average IOPS or I/Os per second (e.g., for reads and/or writes), average data transfer rate (e.g., bytes/second for reads and/or writes), and the like.

It should be noted that the determination regarding correspondence between observed and expected I/O activity may be made with respect to a single LUN or other unit of storage to which I/O operations may be directed.

With reference back to FIG. 4, an embodiment in accordance with techniques herein may include the one or more application profiles for supported applications for which customized application-specific best practices are provided and may include one or more generic resource profile specifying generic or general options. A storage administrator may configure storage resources, such as LUNs, file systems, and the like, for use by a particular application for which best practices are provided and may select to use such best practices when provisioning storage at a first point in time. Subsequently, at a second later point in time, the components of FIG. 3A may be used to collect information regarding I/Os issued by the application to measure actual performance and I/O patterns for the application. In this manner, one use of the techniques herein may be to detect whether an application issuing I/Os is the particular application based on observed I/O patterns and determine whether expected performance is obtained when using the application-specific best practices. The I/Os for which the observed I/O profile or pattern is determined may be directed to the storage resources previously provisioned whereby the storage resources were identified in the provisioning dialogue as being for the application and where such resources are configured using application-specific best practices as specified in the application profile. If observed performance does not meet expected performance, it may indicate that further modification to the currently supplied best practices for the application is needed to meet performance expectations.

As another exemplary use of techniques herein, the storage administrator may have configured storage resources for the application at a first point in time. As part of the provisioning dialogue, the storage administrator may indicate that he/she is configuring storage for use by the particular application for which customized application-specific best practices are provided. However, in connection with the provisioning dialogue, the administrator may select not to configure the storage resources using the application-specific best practices. Rather, the administrator may select options to configure generic resources for the application. Techniques herein using the monitor may also detect such occurrences by determining that an executing application's I/O pattern or profile matches an expected I/O pattern or profile and that the storage resources to which the I/Os are directed were previously configured using generic resources and associated options. Detection of the foregoing may be reported to a target site, such as a vendor or other provider of the customized application-specific best practices for further analysis and inquiry. For example, the vendor or other provider of the best practices may inquire of the customer why the best practices provided was not used to configure the application's resources. It may be, for example, that the storage administrator intentionally did not use the customized application-specific best practices because he/she is not satisfied by the offered best practices. This may indicate, for example, that the best practices may require further modification or updating. For example, the best practices may be customized for use with a first version of the application. Perhaps there has been a change or update to the application to a second version which also may require a further update to the best practices. In other words, the existing or current best practices for the first version of the application may be now outdated or stale resulting in unacceptable performance with the second version. Thus, the storage administrator may have intentionally selected not to use the best practices for the application and rather selected a generic resource for use with the application's storage resources. It may also be, for example, that the storage administrator was also unaware of the customized application-specific best practices provided for the application thereby indicating perhaps a problem with the user interface indicating a need to more clearly provide information to a user regarding supported applications for which best practices are provided.

As yet another exemplary use of techniques herein, the storage administrator may have configured storage resources for use by an application at a first point in time and customized application-specific best practices may not be provided for the application. Techniques herein using the monitor may also detect such occurrences by determining that an executing application's I/O pattern or profile does not match any expected I/O pattern or profile for a known application for which best practices are provided. In this case, reporting such information to a target site by a large number of customers may indicate a need to provide application specific best practices for the application. The collected information, along with further experimentation, may be used in determining the best practices to be provided for the new application.

The foregoing are some exemplary uses of techniques herein to better assess and understand how application aware provisioning using the application-specific best practices is actually used by customers, identify a need for introducing additional application-specific best practices for new applications, and identify when currently provided best practices for supported applications may need to be updated or modified (e.g., such as when expected performance is not being achieved when using storage resources provisioned in accordance with current best practices for the application).

Referring to FIG. 7, shown is an example 400 summarizing different cases that may be identified using techniques herein such as described above using the components of FIG. 3A. The example 400 includes a table summarizing some instances that may be identified, along with possibly others, in an embodiment. The example 400 includes a case 410, criteria 420, and results or actions 430. Each row in the table of 400 identifies a particular case and associated criteria and result that may concluded and actions taken in response to detection of the criteria being matched. Row 402 identifies case A having associated criteria where an observed application fingerprint or I/O profile matches that of a known application's fingerprint or I/O profile as may be included in a known application profile such as described above (e.g., element 310 of FIG. 6, I/O pattern of FIG. 4 in an application profile such as 112a). The criteria of case A also includes determining a match between the application or application type of the known application (having the matching fingerprint) and the application or application type (e.g., email application such as Microsoft Exchange) associated with the provisioned storage resource(s) to which the observed I/Os are directed. The criteria of case A also includes determining that the provisioned storage resources to which observed I/Os are directed have been configured using the application-specific best practices for the known application (having the matching fingerprint and matching application or application type). Determining that the provisioned storage resources to which observed I/Os are directed have been configured using the application-specific best practices for the known application may be determined, for example, by comparing the key parameters of the provisioned storage resources to which observed I/Os are directed to key parameters included in the best practices for the known application. The criteria of case A also includes determining that observed performance meets expected performance limits or thresholds (e.g., within specified performance limits or thresholds specified for one or more performance metrics for the known application). In this manner, for case A, a match has been determined between application fingerprint, application or application type, application best practices, and performance thresholds or limits for an observed application and a known application. The foregoing information for the known application may be included in one of the application profiles such as described above in connection with FIGS. 4, 5 and 6. Once case A has been determined based on the foregoing criteria of 402, an embodiment may conclude that the currently specified best practices are performing well or in accordance with expected performance limits. Information may be reported to a target location indicating this for the particular known application.

Row 404 identifies case B having associated criteria where an observed application fingerprint or I/O profile matches that of a known application's fingerprint or I/O profile as may be included in a known application profile such as described above (e.g., element 310 of FIG. 6, I/O pattern of FIG. 4 in an application profile such as 112a). The criteria of case B also includes determining a match between the application or application type of the known application (having the matching fingerprint) and the application or application type (e.g., email application such as Microsoft Exchange) associated with the provisioned storage resource(s) to which the observed I/Os are directed. The criteria of case B also includes determining that the provisioned storage resources to which observed I/Os are directed have been configured using the application-specific best practices for the known application (having the matching fingerprint and matching application or application type). Determining that the provisioned storage resources to which observed I/Os are directed have been configured using the application-specific best practices for the known application may be determined, for example, by comparing the key parameters of the provisioned storage resources to which observed I/Os are directed to key parameters included in the best practices for the known application. The criteria of case B also includes determining that observed performance does not meet expected performance limits or thresholds (e.g., within specified performance limits or thresholds specified for one or more performance metrics for the known application). In this manner, for case B, a match has been determined between application fingerprint, application or application type, and application best practices for an observed application and a known application but the observed performance thresholds or limits for the observed application does not meet those expected for the known application when using storage resources provisioned in accordance with application-specific best practices. The foregoing information for the known application may be included in one of the application profiles such as described above in connection with FIGS. 4, 5 and 6. Once case B has been determined based on the foregoing criteria of 404, an embodiment may conclude that the further analysis is needed since specified best practices for the known application are not performing in accordance with expected performance limits. Information may be reported to a target location indicating this for the particular known application.

In connection with performing further analysis with case B 404, problem analysis may include, for example, gathering information regarding the customer environment (e.g., network), connectivity between the servers and data storage system, and the like, since the performance problem may not be due to the best practices for data storage resource key parameters. Rather, the problem may be caused by something in the customer's environment, such as network and connectivity issues, unrelated to the best practices for the provisioned storage resources.

Row 406 identifies case C having associated criteria where an observed application fingerprint or I/O profile matches that of a known application's fingerprint or I/O profile as may be included in a known application profile such as described above (e.g., element 310 of FIG. 6, I/O pattern of FIG. 4 in an application profile such as 112a). The criteria of case C also includes determining no match between the application or application type of the known application (having the matching fingerprint) and the application or application type (e.g., email application such as Microsoft Exchange) associated with the provisioned storage resource(s) to which the observed I/Os are directed. The criteria of case C also includes determining that the provisioned storage resources to which observed I/Os are directed have not been configured using the application-specific best practices for the known application (having the matching fingerprint and matching application or application type). In this manner, for case C, a match has been determined between application fingerprint for an observed application and a known application but the storage resources were not provisioned in accordance with application-specific best practices. The foregoing information for the known application may be included in one of the application profiles such as described above in connection with FIGS. 4, 5 and 6. Once case C has been determined based on the foregoing criteria of 406, an embodiment may conclude that the further analysis is needed since specified best practices for the known application have not been used in configuring storage resources for the known application. It is presumed that the observed application is the known application based on the matching fingerprints (e.g., I/O profiles or patterns). As noted above, it may be that the storage administrator intentionally did not use the provided application-specific best practices such as because the administrator is not satisfied with the currently provided best practices (e.g., currently provided best practices customized for the application may require further modification or updating). Information may be reported to a target location indicating this for the particular known application.

Row 408 identifies case D having associated criteria where an observed application fingerprint or I/O profile does not match that of any known application's fingerprint or I/O profile as may be included in a known application profile such as described above (e.g., element 310 of FIG. 6, I/O pattern of FIG. 4 in an application profile such as 112a). Once case D has been determined based on the foregoing criteria of 408, an embodiment may conclude that the further analysis is needed since no specified best practices are currently supplied for the observed application having the observed application fingerprint. Information may be reported to a target location indicating this for the particular known application. As noted above, if a number of customers have the same observed application fingerprint not matching any known application, it may indicate a need to provide an additional new set of application specific best practices for the unknown observed application. By reporting such information from many customer sites to the target location, such a scenario may be identified and analysis performed to provide the new set of best practices for the currently unsupported application.

It should be noted that an embodiment may include additional criteria and associated cases which are determined in accordance with techniques herein.

Figure 8:
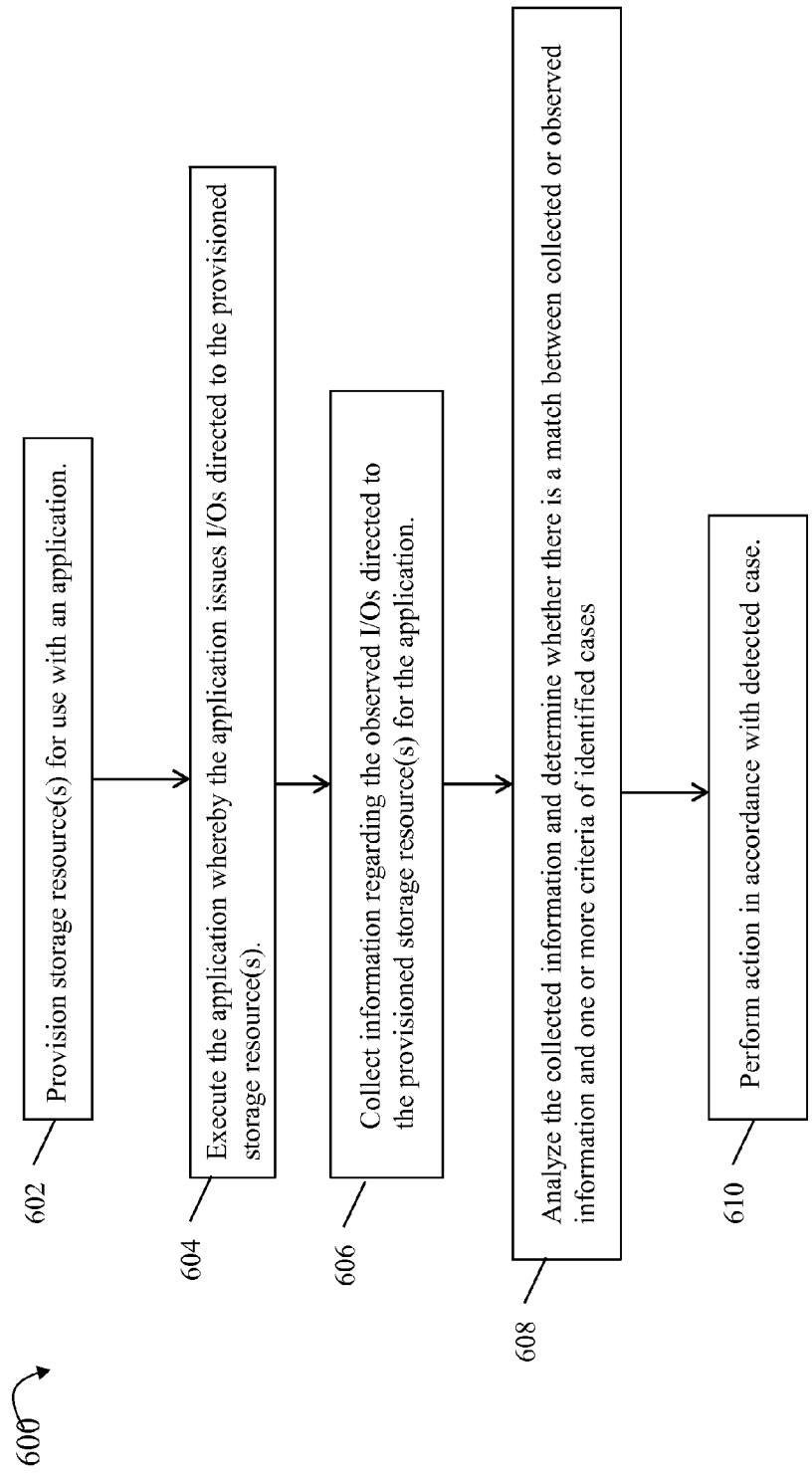
FIG. 8 is a flowchart of processing steps that may be performed in an embodiment in accordance with techniques herein.

Referring to FIG. 8, shown is a flowchart of processing steps that may be performed in an embodiment in accordance with techniques herein. The flowchart 600 summarizes processing steps described above. In step 602, one or more storage resources may be provisioned for use with an application on a customer's data storage system. At step 604, the application may be executed whereby the application issues I/Os directed to the provisioned resources. In step 606, the monitor may collect information regarding the observed I/Os directed to the provisioned storage resources of the application. At step 608, the monitor may analyze the collected information and determine whether there is a match between collected or observed information and one or more criteria of identified cases (e.g., such as those identified in connection with FIG. 7). Responsive to determining one of the identified cases, an action may be performed. Such action may include, for example, reporting information to a target location and performing further analysis. Such further analysis at the customer's site and/or target location to which information is reported may include, for example, manual and/or automated techniques for following up with a customer, determining whether to update existing best practices, determining whether to add a new set of best practices customized for an additional new application, and the like.

An embodiment may implement the techniques herein using code executed by a processor. For example, an embodiment may implement the techniques herein using code which is executed by a processor of the data storage system, or more generally any other system. As will be appreciated by those skilled in the art, the code may be stored on the data storage system on a computer-readable storage medium (also referred to as a computer readable medium) having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of analyzing storage resources comprising:
provisioning a set of one or more storage resources for storing data of a first application, wherein said provisioning includes:
determining whether an application profile set of one or more application profiles includes an application profile for the first application, wherein the application profile includes customized data storage configuration options used when provisioning storage for the first application; and
if it is determined that there is no application profile in the application profile set for the first application, provisioning said set of one or more storage resources using generic configuration options that are included in a generic resource profile and that are not customized for a specific application;
monitoring I/O operations received at a data storage system from the first application, said I/O operations being directed to the set of one or more storage resources;
collecting, in accordance with said monitoring, first information characterizing the I/O operations from the first application;
determining, using the first information, a first execution profile for the first application characterizing I/O operations of the first application;
determining whether the first execution profile of the first application matches any of a set of one or more predetermined execution profiles of the application profile set for one or more known applications, each of said one or more predetermined execution profiles characterizing I/O operations of one of the known applications; and
performing first processing in accordance with one or more criteria, said one or more criteria including whether the first execution profile matches any of the set of one or more predetermined execution profiles.

2. The method of claim 1, wherein the first execution profile includes any of a size of a write operation, a size of a read operation, an average size of a read operation, an average size of a write operation, a maximum size of a read operation, a maximum size of a write operation, a percentage, mixture, or ratio of read to write operations, a percentage or ratio of reads that are sequential, a percentage or ratio of reads that are random, a total number of I/O operations/time period, a number of read operations/time period, a number of write operations/time period, and an average size of an I/O operation determined for a time period.

3. The method of claim 1, wherein the method includes:
collecting information on key parameters of the set of one or more storage resources and wherein said criteria includes whether one or more of the key parameters of the set of one or more storage resources match one or more predetermined key parameters of storage resources included in a customized set of options for one of the known applications and whether a first application type associated with the first application matches a predetermined application type associated with one of the known applications.

4. The method of claim 3, wherein the first execution profile matches a first known execution profile that is associated with a first of the known applications and included in the set of one or more predetermined execution profiles, and wherein the first application type associated with the first application matches a predetermined application type associated with the first known application and wherein the one or more key parameters of the set of one or more storage resources match one or more predetermined key parameters of storage resources included in a customized set of options for the first known application thereby indicating that the customized set of options was previously used in connection with provisioning the set of one or more storage resources.

5. The method of claim 4, wherein said criteria includes whether observed performance of the first application is in accordance with expected performance associated with the first known application, said method further comprising:
collecting, in accordance with said monitoring, performance data for the first application, said performance data including a first metric providing a measure of performance for the first application; and
determining whether the performance data for the first application is in accordance with one or more expected thresholds associated with the first known application.

6. The method of claim 5, wherein if the performance data for the first application is not in accordance with the one or more expected thresholds associated with the first known application, said first processing includes:
reporting information regarding the first application and the performance data for the first application not being in accordance with the one or more expected thresholds associated with the first known application to a target location; and determining whether one or more predetermined key parameters of storage resources included in the customized set of options for the first known application require modification to improve performance thereby resulting in an updated version of the customized set of options for the first known application.

7. The method of claim 3, wherein the first execution profile matches a first known execution profile that is associated with a first of the known applications and included in the set of one or more predetermined execution profiles, and wherein the first application type associated with the first application does not match a predetermined application type associated with the first known application and wherein the one or more key parameters of the set of one or more storage resources do not match one or more predetermined key parameters of storage resources included in a predetermined customized set of options for the first known application thereby indicating that the set of one or more storage resources is not configured using the predetermined customized set of options for the first known application, and said first processing includes:

reporting information to a target location regarding the first application matching the first execution profile of the first known application whereby the first application uses the set of one of more storage resources not configured using the predetermined customized set of options for the first known application; and determining whether one or more predetermined key parameters of storage resources included in the customized set of options for the first known application require modification to improve performance thereby resulting in an updated version of the customized set of options for the first known application.

8. The method of claim 3, wherein the first execution profile matches a first known execution profile that is associated with a first of the known applications and included in the set of one or more predetermined execution profiles, and wherein the first application type associated with the first application matches a predetermined application type associated with the first known application and wherein the one or more key parameters of the set of one or more storage resources match one or more predetermined key parameters of storage resources included in a default set of options not customized for the first known application thereby indicating that further processing is needed to determine whether a predetermined customized set of options for the first known application requires modification.

9. The method of claim 1, wherein the first execution profile does not match any of the set of one or more predetermined execution profiles thereby indicating that the first application is not one of the known applications.

10. The method of claim 9, wherein said first processing includes:

reporting first information to a target location, said first information including the first execution profile and one or more key parameters of the set of one or more storage resources, said first information indicating that the first execution profile does not match any of the set of one or more predetermined execution profiles thereby indicating that the first application is not one of the known applications; and determining, using the first execution profile and one or more key parameters of the set of one or more storage resources, a new predetermined customized set of options for the first application.

11. The method of claim 3, wherein the one or more predetermined parameters identifying one or more customized configuration options for a known application include any of a RAID (Redundant Array of Independent or Inexpensive Disks) protection level, a RAID layout configuration including a number of data members and parity members, one or more data storage tiers to be used in connection with storing data for the application, an indicator as to whether it is allowable for data of the application to be automatically migrated between storage tiers, an indicator as to whether to data for the application is stored on a virtually provisioned device, an indicator as to whether to perform compression when storing data of the application, an indicator as to whether to perform encryption when storing data of the application, an indicator as to whether to perform deduplication when storing data of the application, a storage tier of physical devices for storing application data, a type of physical device for storing application data, and a size for a storage resource.

12. A system comprising:

one or more application servers, wherein one or more applications execute on each of said application servers;

a data storage system including one or more storage resources used by each of said applications executing on the application servers; and a computer readable medium comprising code stored thereon which, when executed by a processor, performs processing including:

provisioning a set of one or more storage resources for storing data of a first of the applications, wherein said provisioning includes:

determining whether an application profile set of one or more application profiles includes an application profile for the first application, wherein the application profile includes customized data storage configuration options used when provisioning storage for the first application; and if it is determined that there is no application profile in the application profile set for the first application, provisioning said set of one or more storage resources using generic configuration options that are included in a generic resource profile and that are not customized for a specific application;

monitoring I/O operations received at the data storage system from the first application, said I/O operations being directed to the set of one or more storage resources;

collecting, in accordance with said monitoring, first information characterizing the I/O operations from the first application;

determining, using the first information, a first execution profile for the first application characterizing I/O operations of the first application;

determining whether the first execution profile of the first application matches any of a set of one or more predetermined execution profiles of the application profile set for one or more known applications, each of said one or more predetermined execution profiles characterizing I/O operations of one of the known applications; and performing first processing in accordance with one or more criteria, said one or more criteria including whether the first execution profile matches any of the set of one or more predetermined execution profiles.

13. A non-transitory computer readable medium comprising code stored thereon that, when executed, performs a method for analyzing storage resources comprising:

provisioning a set of one or more storage resources for storing data of a first application, wherein said provisioning includes:
  determining whether an application profile set of one or more application profiles includes an application profile for the first application, wherein the application profile includes customized data storage configuration options used when provisioning storage for the first application; and
  if it is determined that there is no application profile in the application profile set for the first application, provisioning said set of one or more storage resources using generic configuration options that are included in a generic resource profile and that are not customized for a specific application;
monitoring I/O operations received at a data storage system from the first application, said I/O operations being directed to the set of one or more storage resources;
collecting, in accordance with said monitoring, first information characterizing the I/O operations from the first application;
determining, using the first information, a first execution profile for the first application characterizing I/O operations of the first application;
determining whether the first execution profile of the first application matches any of a set of one or more predetermined execution profiles of the application profile set for one or more known applications, each of said one or more predetermined execution profiles characterizing I/O operations of one of the known applications; and
performing first processing in accordance with one or more criteria, said one or more criteria including whether the first execution profile matches any of the set of one or more predetermined execution profiles.

14. The non-transitory computer readable medium of claim 13, wherein the first execution profile includes any of a size of a write operation, a size of a read operation, an average size of a read operation, an average size of a write operation, a maximum size of a read operation, a maximum size of a write operation, a percentage, mixture, or ratio of read to write operations, a percentage or ratio of reads that are sequential, a percentage or ratio of reads that are random, a total number of I/O operations/time period, a number of read operations/time period, a number of write operations/time period, and an average size of an I/O operation determined for a time period.

15. The non-transitory computer readable medium of claim 13, wherein the method further comprises:
  collecting information on key parameters of the set of one or more storage resources and wherein said criteria includes whether one or more of the key parameters of the set of one or more storage resources match one or more predetermined key parameters of storage resources included in a customized set of options for one of the known applications and whether a first application type associated with the first application matches a predetermined application type associated with one of the known applications.

16. The non-transitory computer readable medium of claim 15, wherein the first execution profile matches a first known execution profile that is associated with a first of the known applications and included in the set of one or more predetermined execution profiles, and wherein the first application type associated with the first application matches a predetermined application type associated with the first known application and wherein the one or more key parameters of the set of one or more storage resources match one or more predetermined key parameters of storage resources included in a customized set of options for the first known application thereby indicating that the customized set of options was previously used in connection with provisioning the set of one or more storage resources.

17. The non-transitory computer readable medium of claim 16, wherein said criteria includes whether observed performance of the first application is in accordance with expected performance associated with the first known application, and where the method further comprises:
  collecting, in accordance with said monitoring, performance data for the first application, said performance data including a first metric providing a measure of performance for the first application; and
  determining whether the performance data for the first application is in accordance with one or more expected thresholds associated with the first known application.

18. The non-transitory computer readable medium of claim 17, wherein if the performance data for the first application is not in accordance with the one or more expected thresholds associated with the first known application, said first processing includes:
  reporting information regarding the first application and the performance data for the first application not being in accordance with the one or more expected thresholds associated with the first known application to a target location; and
  determining whether one or more predetermined key parameters of storage resources included in the customized set of options for the first known application require modification to improve performance thereby resulting in an updated version of the customized set of options for the first known application.

19. The non-transitory computer readable medium of claim 15, wherein the first execution profile matches a first known execution profile that is associated with a first of the known applications and included in the set of one or more predetermined execution profiles, and wherein the first application type associated with the first application does not match a predetermined application type associated with the first known application and wherein the one or more key parameters of the set of one or more storage resources do not match one or more predetermined key parameters of storage resources included in a predetermined customized set of options for the first known application thereby indicating that the set of one or more storage resources is not configured using the predetermined customized set of options for the first known application, and said first processing includes:
  reporting information to a target location regarding the first application matching the first execution profile of the first known application whereby the first application uses the set of one of more storage resources not configured using the predetermined customized set of options for the first known application; and
  determining whether one or more predetermined key parameters of storage resources included in the customized set of options for the first known application require modification to improve performance thereby resulting in an updated version of the customized set of options for the first known application.

20. The non-transitory computer readable medium of claim 13, wherein the first execution profile does not match any of the set of one or more predetermined execution profiles thereby indicating that the first application is not one of the known applications, and wherein said first processing includes:
  reporting first information to a target location, said first information including the first execution profile and one or more key parameters of the set of one or more storage resources, said first information indicating that the first execution profile does not match any of the set of one or more predetermined execution profiles thereby indicating that the first application is not one of the known applications; and determining, using the first execution profile and one or more key parameters of the set of one or more storage resources, a new predetermined customized set of options for the first application.

* * * * *